(12) United States Patent
Cho et al.

(10) Patent No.: US 11,246,106 B2
(45) Date of Patent: Feb. 8, 2022

(54) ELECTRONIC DEVICE FOR PERFORMING POWER CONTROL

(71) Applicant: LG ELECTRONICS INC., Seoul (KR)

(72) Inventors: Eunbit Cho, Seoul (KR); Inkyung Kim, Seoul (KR); Younghee Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/048,480

(22) PCT Filed: Jan. 11, 2019

(86) PCT No.: PCT/KR2019/000452
§ 371 (c)(1),
(2) Date: Oct. 16, 2020

(87) PCT Pub. No.: WO2019/208906
PCT Pub. Date: Oct. 31, 2019

(65) Prior Publication Data
US 2021/0168736 A1    Jun. 3, 2021

Related U.S. Application Data

(60) Provisional application No. 62/663,235, filed on Apr. 26, 2018.

(51) Int. Cl.
*H04W 52/52*    (2009.01)
*H04W 52/30*    (2009.01)
(Continued)

(52) U.S. Cl.
CPC ........... *H04W 52/52* (2013.01); *H04W 52/30* (2013.01); *H04W 52/50* (2013.01); *H04W 88/06* (2013.01)

(58) Field of Classification Search
CPC .............................................. H04W 52/00–60
See application file for complete search history.

(56) References Cited

U.S. PATENT DOCUMENTS

2017/0257794 A1* 9/2017 Kim ..................... H04W 76/28
2018/0020418 A1* 1/2018 Chandramouli ...... H04W 16/14
(Continued)

FOREIGN PATENT DOCUMENTS

KR    20100076890    7/2010
KR    20110095906    8/2011
(Continued)

OTHER PUBLICATIONS

PCT International Application No. PCT/KR2019/000452, International Search Report dated Apr. 17, 2019, 2 pages.
(Continued)

*Primary Examiner* — Raymond S Dean
(74) *Attorney, Agent, or Firm* — Lee, Hong, Degerman, Kang & Waimey PC

(57) ABSTRACT

An electronic device according to the present invention comprises: a first power amplifier for amplifying a first signal to a first power value in a first frequency band of a first communication system; and a second power amplifier for amplifying a second signal to a second power value in a second frequency band of a second communication system. The electronic device may comprise a baseband processor for: when the first and the second signal are transmitted at the same time, determining whether an average value of power values fed back from the first and the second power amplifier for a regular time interval exceeds a threshold value; and when the average value exceeds the threshold value, decreasing a gain of at least one of the first and the second power amplifier at regular time intervals.

17 Claims, 7 Drawing Sheets

(51) Int. Cl.
*H04W 52/50* (2009.01)
*H04W 88/06* (2009.01)

(56) References Cited

U.S. PATENT DOCUMENTS

2018/0183717 A1* 6/2018 Panchai .............. H04L 47/2475
2019/0223114 A1* 7/2019 Kwok ............... H04W 28/0858
2019/0297700 A1* 9/2019 Gal ........................ H05B 45/20
2021/0203297 A1* 7/2021 Jakobsson ................ H03F 3/19

FOREIGN PATENT DOCUMENTS

| KR | 1020140084290 | 7/2014 |
| KR | 20140143459 | 12/2014 |
| KR | 20160025487 | 3/2016 |
| KR | 20170106695 | 9/2017 |

OTHER PUBLICATIONS

Korean Intellectual Property Office Application No. 10-2020-7030327 Office Action dated Nov. 22, 2021, 7 pages.

* cited by examiner

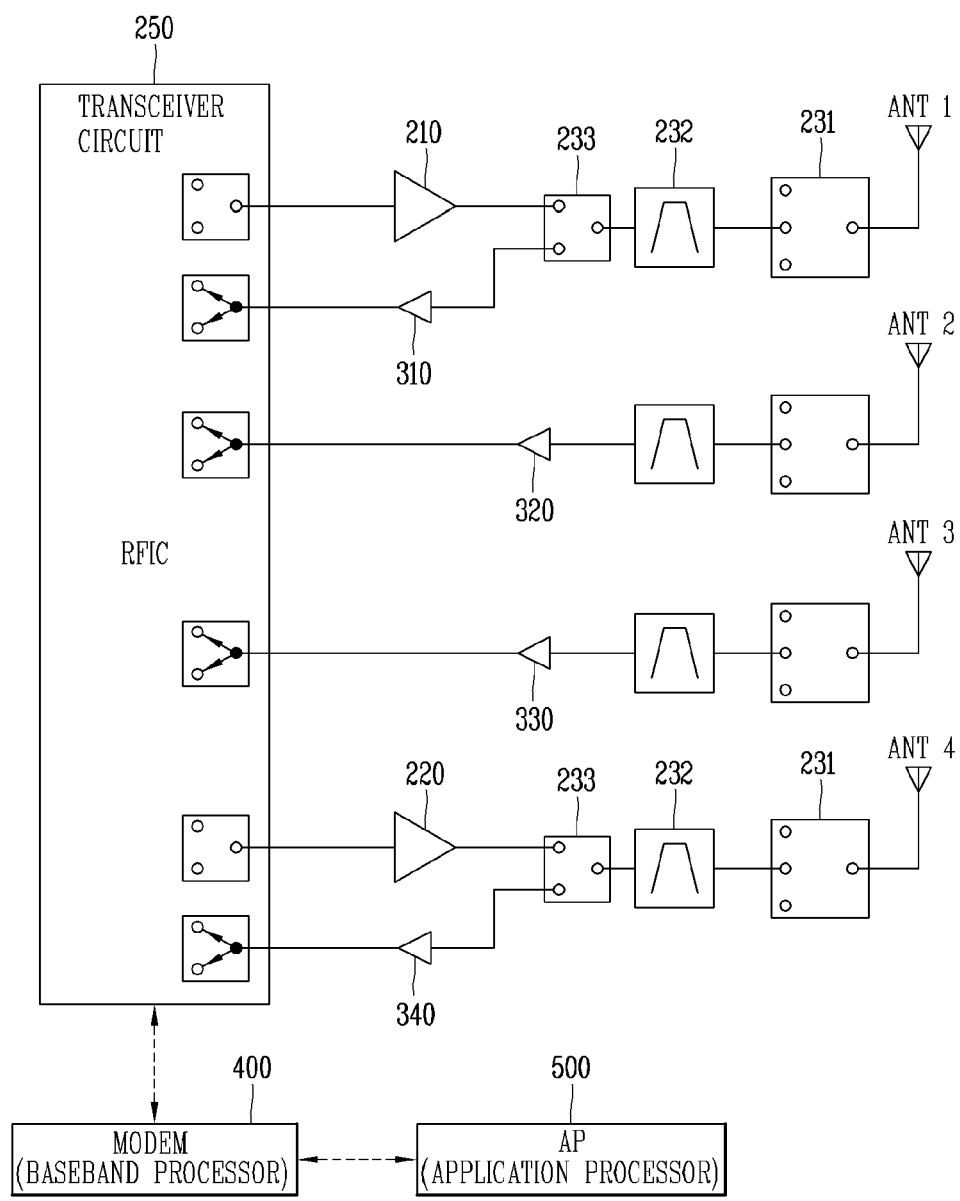

ELECTRONIC DEVICE FOR PERFORMING POWER CONTROL

CROSS-REFERENCE TO RELATED APPLICATIONS

This application is the National Stage filing under 35 U.S.C. 371 of International Application No. PCT/KR2019/000452, filed on Jan. 11, 2019, which claims the benefit of U.S. Provisional Application No. 62/663,235, filed on Apr. 26, 2018, the contents of which are all hereby incorporated by reference herein in their entirety.

TECHNICAL FIELD

The present disclosure relates to an electronic device configured to control power, and more particularly, to an electronic device that performs power control on a transmission signal in a plurality of communication systems.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices have been diversified. Examples of such functions include data and voice communications, capturing images and video with a camera, recording audio, playing music files with a speaker system, and displaying images and video on a display. Some terminals additionally provide functions such as playing an electronic game, or executing a function of multimedia players. Specifically, in recent time, mobile terminals can receive broadcast and multicast signals to allow viewing of video or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication service.

In this regard, an electronic device may be configured to provide 5G communication service in various frequency bands. Recently, attempts have been made to provide 5G communication service using Sub 6 band at or below 6 GHz band. However, in the future, it is expected to provide 5G communication service using millimeter wave (mmWave) band in addition to Sub 6 band for faster data rate.

Meanwhile, the electronic device can transmit signals not only through 4G but also through 5G new radio (NR). In such case of 4G+5G multiple transmission, NR transmission may be dropped when exceeding a total transmission power limit Pmax.

In this regard, if a 4G transmission power and an NR transmission power can be adjusted before NR transmission is dropped, unnecessary drop of NR transmission can be prevented. However, in the case of 4G+5G multiple transmission, there is no specific discussion on how to control 4G transmission power value and 5G transmission power value.

In addition, in the case of 4G+5G multiple transmission, it has not been discussed on how to control each transmission power using what hardware configuration in order to control 4G transmission power value and 5G transmission power value.

DETAILED DESCRIPTION OF THE DISCLOSURE

Technical Problem

An aspect of the present disclosure is to solve the aforementioned problems and other drawbacks. In addition, another aspect is to provide an electronic device capable of limiting a total transmission power during multiple transmission by using different communication systems.

Another aspect of the present disclosure is to provide a method for detecting transmission power through one communication system to control transmission power through another communication system accordingly, and an electronic device performing the same.

Technical Solution

To achieve these and other advantages and in accordance with the purpose of this specification, as embodied and broadly described herein, there is provided an electronic device including a first power amplifier for amplifying a first signal to a first power value in a first frequency band of a first communication system, and a second power amplifier for amplifying a second signal to a second power value in a second frequency band of a second communication system. The electronic device may include a baseband processor for determining whether an average value of power values fed back from the first power amplifier for a predetermined time section exceeds a threshold value when the first signal and the second signal are transmitted at the same time, and decreasing a gain of at least one of the first power amplifier and the second power amplifier at predetermined time intervals when the average value exceeds the threshold value. Therefore, when multiple transmissions are performed through multiple communication systems, the electronic device can limit total transmit power on the basis of the average of fed back power values.

In an embodiment, the baseband processor may control a transceiver circuit to reduce the gain of the second power amplifier of a 5G communication system so as a sum of the first power value and the second power value to be equal to or less than a maximum allowable power value when the sum of the first power value and the second power value requested from the first communication system and the second communication system exceeds the maximum allowable power value. Accordingly, an electronic device capable of, based on an average of power values fed back from one power amplifier during multiple transmission through a plurality of communication systems, controlling a transmission power value of another communication system may be provided.

In an embodiment, the baseband processor may determine an output power value of the second power amplifier based on an upper bound of the threshold value when the average value is greater than or equal to a lower bound of the threshold value for each power section for the first power value.

In an embodiment, the baseband processor may control the transceiver circuit so that the first power value and the second power value are scaled to be reduced in a same ratio when the sum of the first power value and the second power value exceeds the maximum allowable power value and a difference between the first power value and the second power value is less than or equal to a specific value.

In an embodiment, the baseband processor may control the transceiver circuit so that the first power value is scaled to be increased to the maximum allowable power value in a time section where a packet transmission through the second communication system is not performed.

In an embodiment, the transceiver circuit may reduce a gain of a driving amplifier at a rear stage of the second power amplifier when the gain of the second power amplifier of the 5G communication system is greater than or equal to a first gain value.

In an embodiment, the baseband processor may reduce the first power value and the second power value in a same ratio to limit a total power value to be less than or equal to a maximum allowable power value. In addition, the baseband processor may control the first power value to be increased to the maximum allowable power value when transmitting a first signal only to a first base station of the first communication system.

In an embodiment, the baseband processor may control the second power value to be increased to the maximum allowable power value when transmitting a second signal only to a second base station of the second communication system.

In an embodiment, the baseband processor may control the transceiver circuit so that the first power value and the second power value are scaled to be reduced in a ratio of a corresponding power value when transmitting the first signal to the first base station while transmitting the second signal.

In an embodiment, the transceiver circuit may include a first transceiver circuit operating in the first communication system, and a second transceiver circuit operating in the second communication system. Here, the first transceiver circuit may measure the first power value for a predetermined time section through a feedback reception path. Accordingly, the baseband processor may receive information on the measured first power value from the first transceiver circuit, and transfer information on the second power value to the second transceiver circuit.

In an embodiment, the baseband processor may allow the first power value according to the fed back average value to be less than or equal to the threshold value to determine the second power value such that a sum of the first power value and the second power value according the fed back average value is less than or equal to a second threshold value.

In an embodiment, the baseband processor may include a second baseband processor that performs power control for the second communication system. Here, the second baseband processor may adjust the gain of the second power amplifier based on the determined second power value.

In an embodiment, the second baseband processor may control a gain of a driving amplifier included in the second transceiver circuit and a gain of an IQ amplifier at a rear stage of a digital pre-distortion (DPD) portion included in the second transceiver circuit to be increased when an input power corresponding to the determined second power value is greater than or equal to a specific value.

According to another aspect of the present disclosure, there is provided an electronic device including a first power amplifier for amplifying a first signal to a first power value in a first frequency band of a first communication system, a second power amplifier for amplifying a second signal to a second power value in a second frequency band of a second communication system, a coupler connected to the first power amplifier and configured to detect the first power value. A baseband processor of the electronic device may be configured to determine whether a sum of the first power value and the second power value exceeds a second threshold value based on an average value of power values fed back from the first power amplifier for a predetermined time section when the first signal and the second signal are transmitted at the same time, and decrease an output power or a gain of at least one of the first power amplifier and the second power amplifier at predetermined time intervals when the sum of the first power value and the second power value exceeds the second threshold value. Therefore, when multiple transmissions are performed through multiple communication systems, the electronic device can limit total transmit power on the basis of the average of fed back power values.

In an embodiment, the transceiver circuit may include a first transceiver circuit operating in the first communication system, and a second transceiver circuit operating in the second communication system. Here, the first transceiver circuit may measure the first power value for a predetermined time section through a feedback reception path. Meanwhile, the baseband processor may receive information on the measured first power value from the first transceiver circuit, and transfer information on the second power value to the second transceiver circuit.

In an embodiment, the baseband processor may allow the first power value according to the fed back average value to be less than or equal to the threshold value to determine the second power value such that a sum of the first power value and the second power value according the fed back average value is less than or equal to the second threshold value.

In an embodiment, the baseband processor may include a second baseband processor that performs power control for the second communication system. Here, the second baseband processor may adjust the gain of the second power amplifier based on the determined second power value.

In an embodiment, the second baseband processor may control a gain of a driving amplifier included in the second transceiver circuit and a gain of an IQ amplifier at a rear stage of a digital pre-distortion (DPD) portion included in the second transceiver circuit to be increased when an input power corresponding to the determined second power value is greater than or equal to a specific value.

Advantageous Effects

An electronic device for transmitting reference signals according to the present disclosure has an advantage of being able to limit a total transmission power based on an average of fed back power values during multiple transmission through a 4G communication system and a 5G communication system.

According to the present disclosure, there is provided an electronic device capable of, based on an average of power values fed back from one power amplifier during multiple transmission through a plurality of communication systems, controlling a transmission power value of another communication system.

BRIEF DESCRIPTION OF THE DRAWINGS

FIG. 2 illustrates a configuration of a wireless communication unit of an electronic device capable of operating in a plurality of wireless communication systems according to the present disclosure.

MODES FOR CARRYING OUT PREFERRED EMBODIMENTS

Figure 1A:
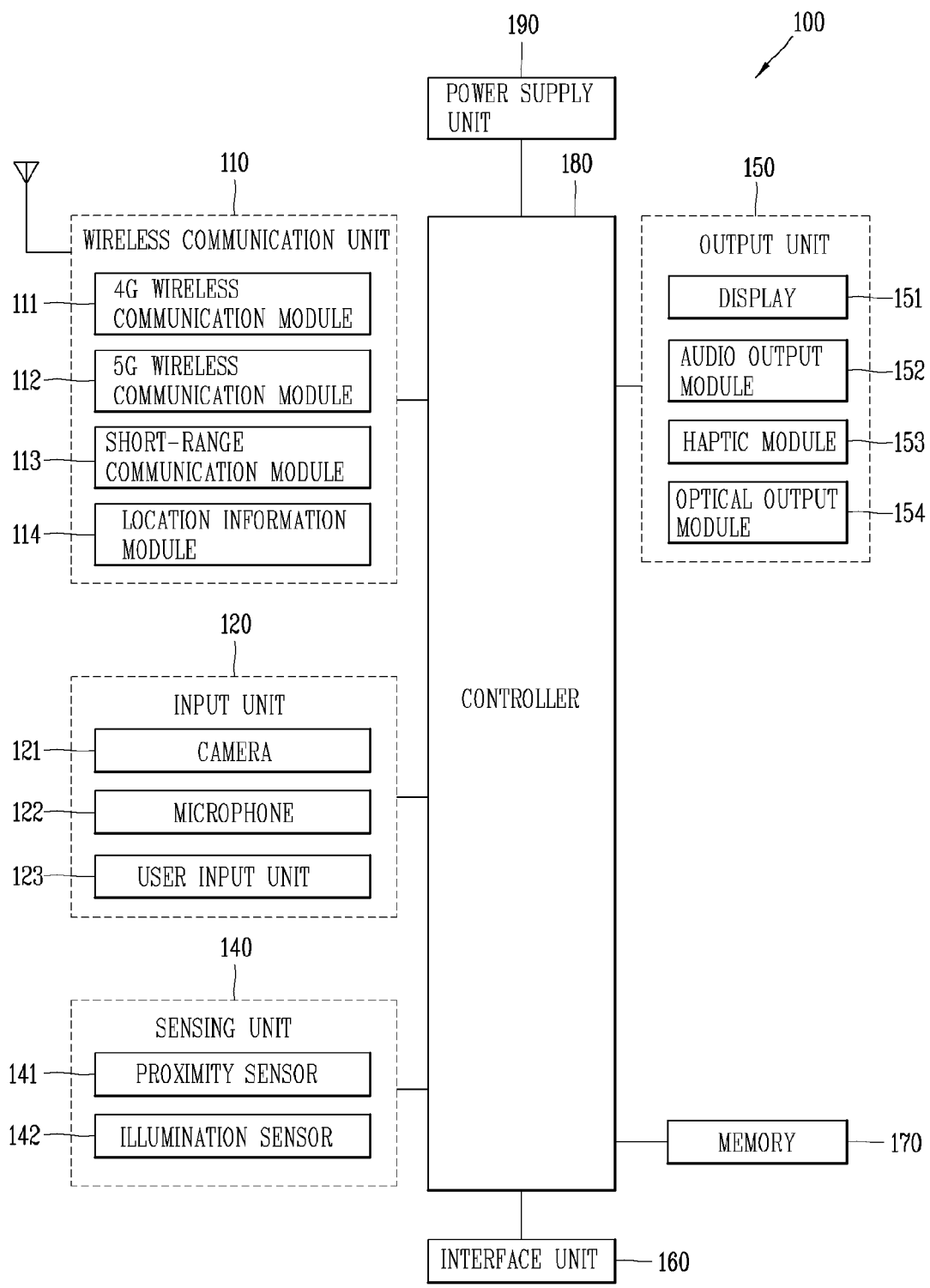
FIG. 1A is a block diagram of an electronic device in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs), and the like.

By way of non-limiting example only, further description will be made with reference to particular types of electronic devices. However, such teachings apply equally to other types of terminals, such as those types noted above. In addition, these teachings may also be applied to stationary terminals such as digital TV, desktop computers, and the like.

Figure 1B:
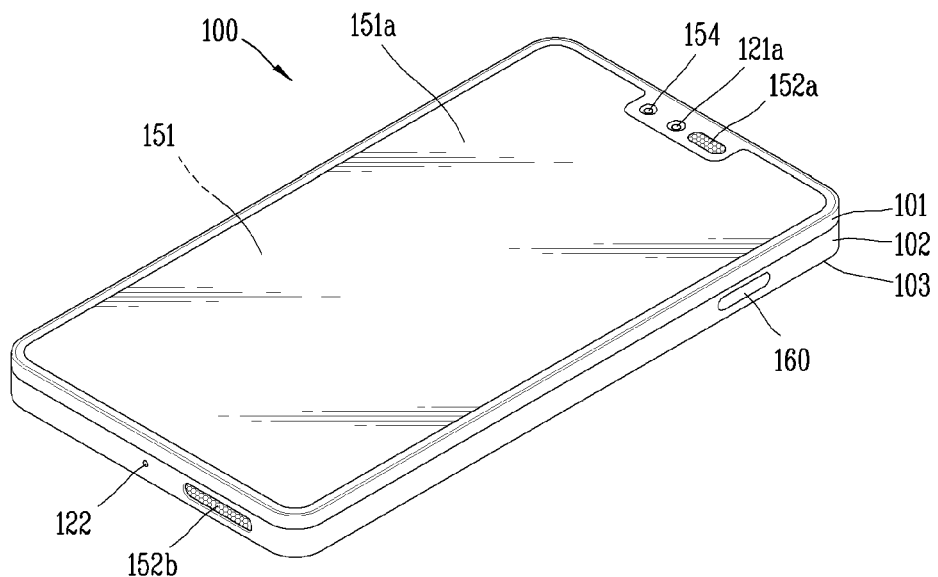
FIGS. 1B and 1C are conceptual views illustrating one example of an electronic device, viewed from different directions.
Figure 1C:
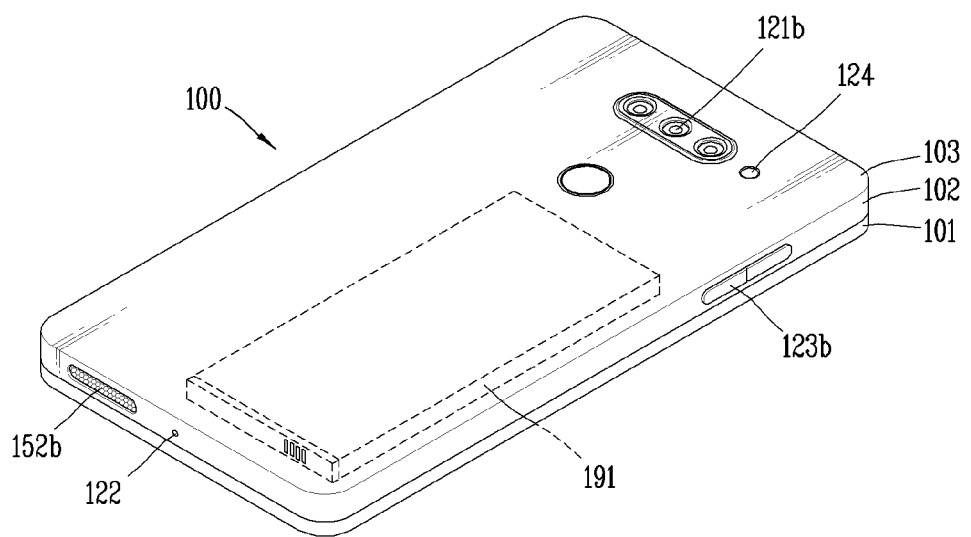

Referring to FIGS. 1A to 1C, FIG. 1A is a block diagram of an electronic device in accordance with the present disclosure, and FIGS. 1B and 1C are conceptual views illustrating one example of an electronic device, viewed from different directions.

An electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the components illustrated in FIG. 1A is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include one or more of a 4G wireless communication module 111, a 5G wireless communication module 112, a short-range communication module 113, and a location information module 114.

The 4G wireless communication module 111 may transmit and receive 4G signals through a 4G mobile communication network with a 4G base station. Here, the 4G wireless communication module 111 may transmit one or more 4G transmission signals to the 4G base station. In addition, the 4G wireless communication module 111 may receive one or more 4G reception signals from the 4G base station.

In this regard, an up-link (UL) multi-input multi-output (MIMO) may be performed by a plurality of 4G transmission signals transmitted to the 4G base station. In addition, a down-link (DL) multi-input multi-output (MIMO) may be performed by a plurality of 4G reception signals received from the 4G base station.

The 5G wireless communication module 112 may transmit and receive 5G signals through a 5G mobile communication network with a 5G base station. Here, the 4G base station and the 5G base station may have a non-stand-alone (NSA) structure. For example, the 4G base station and the 5G base station may have a co-located structure disposed at a same location within a cell. Alternatively, the 5G base station may be disposed at a location separate from the 4G base station in a stand-alone (SA) structure.

The 5G wireless communication module 112 may transmit and receive 5G signals through a 5G mobile communication network with a 5G base station. Here, the 5G wireless communication module 112 may transmit at least one 5G transmission signal to the 5G base station. In addition, the 5G wireless communication module 112 may receive at least one 5G reception signal from the 5G base station.

Here, a 5G frequency band may use a band same as that of a 4G frequency band, and this may be referred to as LTE re-farming. Meanwhile, as the 5G frequency band, a Sub 6 band, which is a band at or below 6 GHz, may be used.

Alternatively, a millimeter wave (mmWave) band may be used as the 5G frequency band to perform broadband high-speed communication. When the millimeter wave (mmWave) band is used, the electronic device 100 may perform beam forming for communication coverage expansion with a base station.

Meanwhile, regardless of the 5G frequency band, in a 5G communication system, a greater number of multi-input multi-output (MIMO) may be supported to improve transmission speed. In this regard, an up-link (UL) MIMO may be performed by a plurality of 5G transmission signals transmitted to the 5G base station. In addition, a down-link (DL) MIMO may be performed by a plurality of 5G reception signals received from the 5G base station.

Meanwhile, the wireless communication unit 110 may be in a dual connectivity (DC) state with a 4G base station and a 5G base station through the 4G wireless communication module 111 and the 5G wireless communication module 112. In this way, the dual connection of the 4G base station and the 5G base station may be referred to as EUTRAN NR DC (EN-DC). Here, the EUTRAN is an evolved universal telecommunication radio access network, which means a 4G wireless communication system, and NR is a new radio, which means a 5G wireless communication system.

Meanwhile, when the 4G base station and the 5G base station have a co-located structure, a throughput can be improved through an inter-carrier aggregation (CA). Therefore, in the EN-DC state of the 4G base station and the 5G base station, a 4G reception signal and a 5G reception signal can be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 113 in general supports a wireless communication between the electronic device 100 and a wireless communication system, a communication between the electronic device 100 and another electronic device 100, or a communication between the electronic device 100 and a network where another electronic device 100 (or an external server) is located, via wireless area network. One example of the wireless area network is a wireless personal area network.

Meanwhile, a short-range communication between electronic devices may be performed using the 4G wireless communication module 111 and the 5G wireless communication module 112. In an embodiment, a short-range communication may be performed between electronic devices through a device-to-device (D2D) method without passing through a base station.

Meanwhile, for transmission speed improvement and communication system convergence, a carrier aggregation (CA) may be performed by using at least one of the 4G wireless communication module 111 and the 5G wireless communication module 112, and a Wi-Fi communication module 113. In this regard, 4G+WiFi carrier aggregation (CA) may be performed by using the 4G wireless communication module 111 and the Wi-Fi communication module 113. Alternatively, 5G+WiFi carrier aggregation (CA) may be performed by using the 5G wireless communication module 112 and the Wi-Fi communication module 113.

The location information module 114 is generally configured to detect, calculate, derive or otherwise identify a position (or current position) of the electronic device. As an example, the location information module 114 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring a position (or current position) and may not be limited to a module for directly calculating or acquiring the position of the electronic device.

Specifically, when utilizing the 5G wireless communication module 112, the electronic device may acquire a location of the electronic device based on information from a 5G base station transmitting or receiving a wireless signal to or from the 5G wireless communication module. In particular, since the 5G base station in the mmWave band is deployed in a small cell having a narrow coverage, it is advantageous in obtaining the location of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the electronic device, surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may include at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and a user and simultaneously provide an output interface between the electronic device 100 and a user.

The interface unit 160 serves as an interface with various types of external devices that are coupled to the electronic device 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. At least one of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply 190 may include a battery, and the battery may be configured to be embedded in the terminal body, or configured to be detachable from the terminal body.

At least some part of the components may cooperatively operate to implement an operation, a control or a control method of an electronic device according to various embodiments disclosed herein. Also, the operation, the control or the control method of the electronic device may be implemented on the electronic device by an activation of at least one application program stored in the memory 170.

Referring to FIGS. 1B and 1C, the disclosed electronic device 100 has a bar-like terminal body. However, the electronic device 100 may alternatively be implemented in any of a variety of configurations. Examples of such configurations include watch type, clip-type, glass-type, or a folder-type, flip-type, slide-type, swing-type, and swivel-type in which two or more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a concept referring to the assembly.

The electronic device 100 will generally include a case (for example, frame, housing, cover, and the like) forming an appearance of the terminal. In this embodiment, the electronic device 100 may include a front case 101 and a rear case 102. Various electronic components are disposed in a space that is formed by coupling the front case 101 and the rear case 102. At least one middle case may be additionally positioned between the front case 101 and the rear case 102.

The display 151 is located on a front side of the terminal body to output information. As illustrated, a window 151a of the display 151 may be mounted on the front case 101 to form a front surface of the terminal body together with the front case 101.

In some embodiments, electronic components may also be mounted in the rear case 102. Examples of such electronic components include a detachable battery, an identification module, a memory card, and the like. Here, a rear cover 103 is shown covering the electronic components, and this cover may be detachably coupled to the rear case 102. Therefore, when the rear cover 103 is detached from the rear case 102, the electronic components mounted in the rear case 102 are externally exposed. Meanwhile, a part of side surfaces of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The electronic device 100 may include the display 151, first and second audio output module 152a and 152b, the proximity sensor 141, the illumination sensor 142, the optical output module 154, first and second cameras 121a and 121b, first and second manipulation units 123a and 123b, the microphone 122, the interface unit 160, and the like.

The display 151 is generally configured to output information processed in the electronic device 100. For example, the display 151 may display execution screen information of an application program executed on the electronic device 100, or user interface (UI) information and graphic user interface (GUI) information in response to the execution screen information.

The display 151 may be implemented using two display devices according to the configuration type of the electronic device 100. For instance, a plurality of the displays 151 may be arranged on one surface with either being spaced apart from each other or being integrated, or may be arranged on different surfaces.

The display 151 may include a touch sensor that senses a touch with respect to the display 151 so as to receive a control command in a touching manner. Accordingly, when a touch is applied to the display 151, the touch sensor may sense the touch, and the controller 180 may generate a control command corresponding to the touch. Contents inputted in the touching manner may be characters, numbers, instructions in various modes, or a menu item that can be specified.

In this way, the display 151 may form a touch screen together with the touch sensor, and in this case, the touch screen may function as the user input unit 123 (see FIG. 1A). In some cases, the touch screen may replace at least some of functions of the first manipulation unit 123a.

The first audio output module 152a may be implemented as a receiver to transmit a call sound to a user's ear and the second audio output module 152b may be implemented as a loud speaker to output various alarm sounds or multimedia playback sounds.

The optical output module 154 is configured to output light when an event is generated. Examples of such an event may include a message reception, a call signal reception, a missed call, an alarm, a schedule alarm, an email reception, information reception through an application, and the like. When a user has checked the generated event, the controller 180 may control the optical output module 154 to stop outputting the light.

The first camera 121a may process image frames such as still or moving images obtained by the image sensor in a capture mode or a video call mode. The processed image frames may then be displayed on the display 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method as long as the method is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

Meanwhile, the electronic device 100 may include a finger scan sensor which scans a user's fingerprint. The controller 180 may use fingerprint information sensed by the finger scan sensor as an authentication means. The finger scan sensor may be installed in the display 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting the electronic device 100 to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The interface unit 160 may be implemented in a form of a socket for accommodating an external card, such as a subscriber identification module (SIM), a user identity module (UIM), or a memory card for storing information.

The second camera 121b may be mounted to a rear surface of the terminal body. The second camera 121b may have an image capturing direction, which is substantially opposite to a direction of the first camera unit 121a.

The second camera 121b may include a plurality of lenses arranged along at least one line. The plurality of lenses may be arranged in a matrix form. The camera may be referred to as an 'array camera.' When the second camera 121b is implemented as an array camera, an image may be captured in various manners using the plurality of lenses and may be obtained in a better quality.

A flash 124 may be disposed adjacent to the second camera 121b. When an image of a subject is captured with the second camera 121b, the flash 124 may illuminate the subject.

The second audio output module 152b may additionally be disposed on the terminal body. The second audio output module 152b may implement a stereophonic sound function in conjunction with the first audio output module 152a, and may be also used for implementing a speaker phone mode when speaking on the phone.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be disposed on a side surface of the terminal. Alternatively, an antenna may be formed in a form of film to be attached onto an inner surface of the rear cover 103, or a case including a conductive material may serve as an antenna.

Meanwhile, a plurality of antennas disposed on the side surface of the terminal may be implemented in four or more to support MIMO. In addition, when the 5G wireless communication module 112 operates in a millimeter wave (mm-Wave) band, as each of the plurality of antennas is implemented as an array antenna, a plurality of array antennas may be disposed in the electronic device.

The terminal body is provided with the power supply unit 190 (see FIG. 1A) to supply power to the electronic device 100. The power supply unit 190 may include a battery 191 mounted in the terminal body or detachably coupled to the terminal body.

Hereinafter, embodiments related to a structure of a multiple transmit system according to the present disclosure and an electronic device having the same, in particular, a power amplifier and an electronic device having the same in a heterogeneous radio system will be described with reference to the accompanying drawings. It will be apparent to those skilled in the art that the present disclosure may be embodied in other specific forms without departing from the spirit or essential characteristics thereof.

FIG. 2 illustrates a configuration of a wireless communication unit of an electronic device capable of operating in a plurality of wireless communication systems according to the present disclosure. Referring to FIG. 2, the electronic device includes a first power amplifier 210, a second power amplifier 220, and a radio-frequency integrated circuit (RFIC) 250. In addition, the electronic device may further include a modem 400 and an application processor 500. Here, the modem 400 and the application processor (AP) 500 may be physically implemented in a single chip, and may be implemented in a logically and functionally separated form. However, the present disclosure is not limited thereto and may be implemented in a form of physically separated chips depending on an application.

Meanwhile, the RFIC 250 and the modem 400 may be referred to as a transceiver circuit 250 and a baseband processor 400, respectively.

Meanwhile, the electronic device includes a plurality of low noise amplifiers (LNAs) 410 to 440 in the receiver. Here, the first power amplifier 210, the second power amplifier 220, the controller 250, and a plurality of low noise amplifiers 310 to 340 are all operable in the first communication system and the second communication system. Here, the first communication system and the second communication system may be a 4G communication system and a 5G communication system, respectively.

As illustrated in FIG. 2, the RFIC 250 may be configured as a 4G/5G integrated type, but is not limited thereto and may be configured as a 4G/5G separate type according to an application. When the RFIC 250 is configured as the 4G/5G integrated type, it is advantageous in a view of synchronization between a 4G circuit and a 5G circuit and has an advantage that control signaling by the modem 400 can be simplified.

Meanwhile, when the RFIC 250 is configured as the 4G/5G separate type, it may be referred to as a 4G RFIC and a 5G RFIC, respectively. In particular, when 5G band and 4G band have a large difference in bands, such as when the 5G band is in a millimeter wave band, the RFIC 250 may be configured as the 4G/5G separate type. And, when the RFIC 250 is configured as the 4G/5G separate type, RF characteristics can be optimized for each of the 4G band and the 5G band.

Meanwhile, even when the RFIC 250 is configured as the 4G/5G separate type, the 4G RFIC and the 5G RFIC can be logically and functionally separated, but physically implemented in one chip.

Meanwhile, the application processor (AP) 500 is configured to control an operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate power circuits of a transmitter and a receiver through the RFIC 250 in a low power mode.

In this regard, when the electronic device is determined to be in an idle mode, the application processor (AP) 500 may control the RFIC 250 through the modem 400 as follows. For example, when the electronic device is in the idle mode, the RFIC 250 may be controlled through the modem 400 such that at least one of the first power amplifier 210 and the second power amplifier 220 operates in a low power mode or is turned off.

According to another embodiment, when the electronic device is in a low battery mode, the application processor (AP) 500 may control the modem 400 to provide a wireless communication capable of a low power communication. For example, when the electronic device is connected to a plurality of entities among the 4G base station, the 5G base station, and an access point, the application processor (AP) 500 may control the modem 400 to enable a wireless communication with a lowest power. Accordingly, even though a throughput is slightly sacrificed, the application processor (AP) 500 may control the modem 400 and the RFIC 250 to perform a short-range communication using only the short-range communication module 113.

According to another embodiment, when a remaining battery capacity of the electronic device is equal to or greater than a threshold value, the modem 400 may be controlled to select an optimal wireless interface. For example, the application processor (AP) 500 may control the modem 400 to receive through both the 4G base station and the 5G base station according to the remaining battery capacity and available radio resource information. Here, the application processor (AP) 500 may receive the remaining battery capacity information from the PMIC, and the available radio resource information from the modem 400. Accordingly, when the remaining battery capacity and the available radio resources are sufficient, the application processor (AP) 500 may control the modem 400 and the RFIC 250 to receive through both the 4G base station and the 5G base station.

Meanwhile, in a multi-transceiving system of FIG. 2, the transmitter and the receiver of a radio system may be integrated into one transceiver. Accordingly, a circuit portion integrating two types of system signals can be removed from an RF front-end.

In addition, since a front-end component can be controlled by the integrated transceiver, the front-end component can be integrated more efficiently than a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed and thereby minimizing system delay, resources can be efficiently allocated.

Meanwhile, the first power amplifier 210 and the second power amplifier 220 may operate in at least one of the first communication system and the second communication system. In this regard, when the 5G communication system operates in the 4G band or the Sub 6 band, the first power amplifier 210 and the second power amplifier 220 can operate in both the first communication system and the second communication system.

On the other hand, when the 5G communication system operates in the millimeter wave (mmWave) band, one of the first power amplifier 210 and the second power amplifier 220 may operate in the 4G band and another one of the first power amplifier 210 and the second power amplifier 220 may operate in the millimeter wave band.

Meanwhile, two different wireless communication systems may be implemented in one antenna by integrating a transceiver and a receiver to implement a two-way antenna. Here, 4×4 MIMO can be implemented using four antennas as illustrated in FIG. 2. Here, 4×4 DL MIMO may be performed through a down-link (DL).

Meanwhile, when the 5G band is the Sub 6 band, first to fourth antennas ANT1 to ANT4 may be configured to operate in both the 4G band and the 5G band. On the other hand, when the 5G band is the millimeter wave (mmWave) band, the first to fourth antennas ANT1 to ANT4 may be configured to operate in any one of the 4G band and the 5G band. Here, when the 5G band is the millimeter wave (mmWave) band, each of the plurality of separate antennas may be configured as an array antenna in the millimeter wave band.

Meanwhile, 2×2 MIMO can be implemented using two antennas connected to the first power amplifier 210 and the second power amplifier 220 among the four antennas. Here, 2×2 up-link (UL) MIMO (2 Tx) may be performed through an up-link (UL). Alternatively, it is not limited to 2×2 UL MIMO, and may be implemented by 1 Tx or 4 Tx. Here, when the 5G communication system is implemented by 1 Tx, only one of the first power amplifier 210 and the second power amplifier 220 needs to operate in the 5G band. Meanwhile, when the 5G communication system is implemented by 4Tx, an additional power amplifier operating in the 5G band may be further provided. Alternatively, a transmission signal may be branched in each of one or two transmission paths, and the branched transmission signal may be connected to a plurality of antennas.

Meanwhile, a switch-type splitter or a power divider is built into the RFIC corresponding to the RFIC 250, so that a separate component does not need to be placed outside, thereby improving component mounting performance. Specifically, a transmitter (TX) of two different communication systems can be selected by using a single pole double throw (SPDT) type switch inside the RFIC corresponding to the controller 250.

Further, an electronic device capable of operating in a plurality of wireless communication systems according to the present disclosure may further include a duplexer 231, a filter 232, and a switch 233.

The duplexer 231 is configured to separate a signal in a transmission band and a signal in a reception band from each other. Here, the signal in the transmission band transmitted through the first power amplifier 210 and the second power amplifier 220 is applied to the antennas ANT1 and ANT4 through a first output port of the duplexer 231. On the other hand, the signal in the reception band received through the antennas ANT1 and ANT4 is received by the low noise amplifiers 310 and 340 through a second output port of the duplexer 231.

The filter 232 may be configured to pass a signal in a transmission band or a reception band and to block a signal in a remaining band. Here, the filter 232 may include a transmission filter connected to the first output port of the duplexer 231 and a reception filter connected to the second output port of the duplexer 231. Alternatively, the filter 232 may be configured to pass only the signal of the transmission band or only the signal of the reception band according to a control signal.

The switch 233 is configured to transmit either a transmission signal or a reception signal. In an embodiment of the present disclosure, the switch 233 may be configured in a single pole double throw (SPDT) form so as to separate the transmission signal and the reception signal in a time division duplex (TDD) scheme. Here, the transmission signal and the reception signal are in a same frequency band, and accordingly, the duplexer 231 may be implemented in a form of a circulator.

Meanwhile, in another embodiment of the present disclosure, the switch 233 can be applied to a frequency division duplex (FDD) scheme. Here, the switch 233 may be configured in a form of a double pole double throw (DPDT) so as to connect or block the transmission signal and the reception signal, respectively. Meanwhile, since the transmission signal and the reception signal can be separated by the duplexer 231, the switch 233 is not necessarily needed.

Meanwhile, the electronic device according to the present disclosure may further include the modem 400 corresponding to the controller. Here, the RFIC 250 and the modem 400 may be referred to as a first controller (or first processor) and a second controller (or second processor), respectively. Meanwhile, the RFIC 250 and the modem 400 may be implemented as physically separate circuits. Alternatively, the RFIC 250 and the modem 400 may be physically implemented in one circuit which is logically or functionally divided.

The modem 400 may perform controlling of transmission and reception of signals and processing of signals through different communication systems through the RFIC 250. The modem 400 may obtain control information received from the 4G base station and/or the 5G base station. Here, the control information may be received through a physical downlink control channel (PDCCH), but is not limited thereto.

The modem 400 may control the RFIC 250 to transmit and/or receive signals through the first communication system and/or the second communication system for a specific time section and from a frequency resource. Accordingly, the RFIC 250 may control transmitting circuits including the first power amplifier 210 and the second power amplifier 220 to transmit a 4G signal or a 5G signal in a specific time section. In addition, the RFIC 250 may control receiving circuits including the first to fourth low noise amplifiers 310 to 340 to receive a 4G signal or a 5G signal in a specific time section.

Meanwhile, detailed operations and functions of the electronic device performing power control according to the present disclosure equipped with the multi-transceiving system as illustrated in FIG. 2 will be described below. In more detail, detailed operations and functions of the electronic device performing power control on transmission signals in a plurality of communication systems will be described below.

Meanwhile, the electronic device according to the present disclosure can operate in a plurality of communication systems. Specifically, the electronic device that transmits a reference signal according to the present disclosure can operate in the first communication system and the second communication system. For example, the first communication system and the second communication system may be a 4G (LTE) communication system and a 5G communication system, but are not limited thereto and may be changed according to an application.

Figure 3:
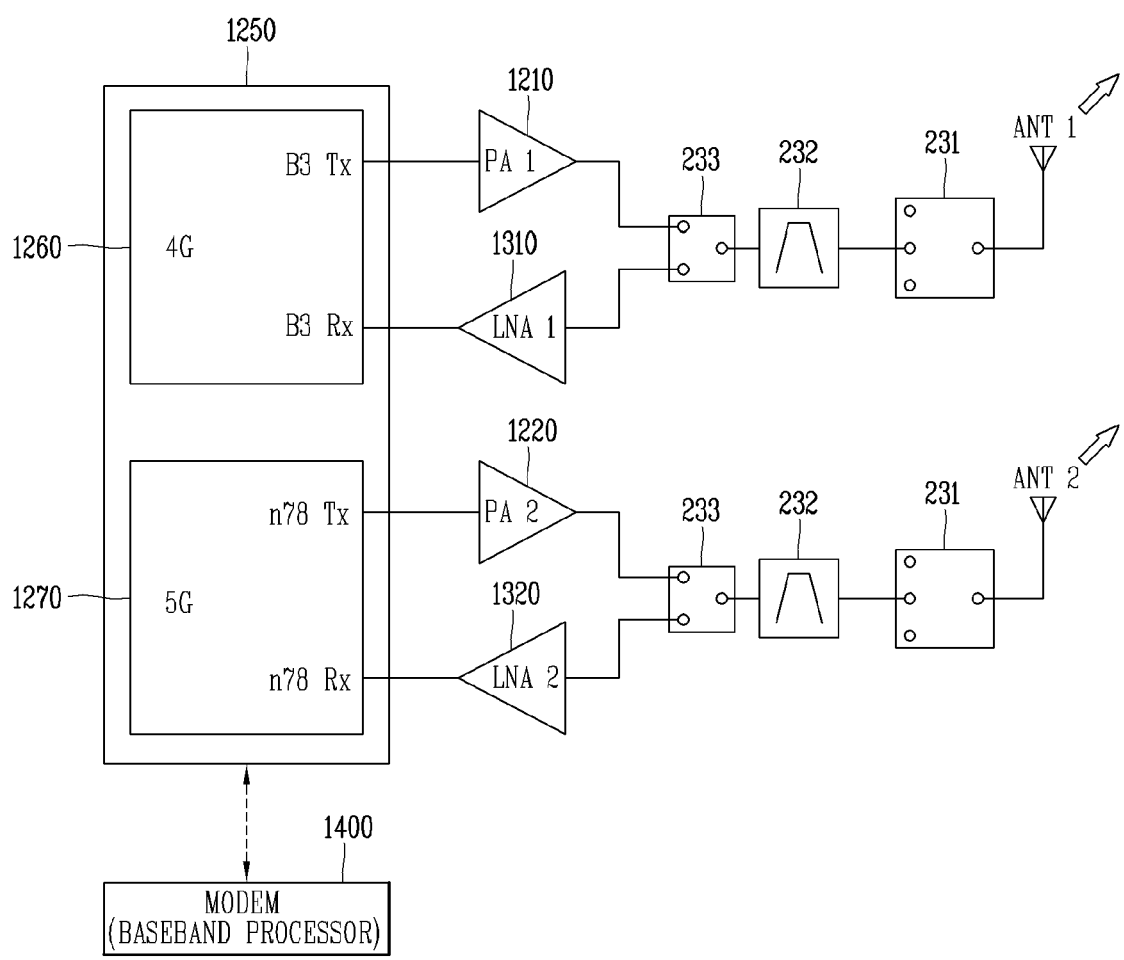
FIG. 3 illustrates a detailed structure for performing a method for limiting total transmission power according to the present disclosure.

Meanwhile, FIG. 3 illustrates a detailed structure for performing a method for limiting total transmission power according to the present disclosure. Meanwhile, the method for limiting total transmission power according to the present disclosure is applicable when two or more power amplifiers such as 2T4R of FIG. 2 are provided. However, for simplicity of explanation, a method for limiting total transmission power when performing multiple transmissions through two communication systems as illustrated in FIG. 3 will be described. However, it is not limited to this structure, and more power amplifiers may be provided or may be applied to a larger number of communication systems depending on an application.

Referring to FIG. 3, the electronic device includes a first power amplifier 1210, a second power amplifier 1220, a transceiver circuit 1250, and a baseband processor 1400. Meanwhile, the transceiver circuit 1250 may include a first transceiver circuit 1260 operating in a first communication system and a second transceiver circuit 1270 operating in a second communication system, but are limited thereto, and can be provided in one piece. Meanwhile, the first transceiver circuit 1260 and the second transceiver circuit 1270 may be physically separated or may be physically implemented in one chip with being functionally separated.

Here, the first power amplifier 1210 and the second power amplifier 1220 are operable in the first communication system and the second communication system, respectively.

Here, the first communication system and the second communication system may be a 4G communication system and a 5G communication system, respectively, but are not limited thereto.

Meanwhile, an aspect and a technical feature of the disclosure for an electronic device that performs transmission power control according to the present disclosure are as follows.

With regard to the aspect of the disclosure, when performing 4G+5G multi-transmission, it may be stipulated to drop NR transmission when exceeding Pmax in relation to a total transmission power limit Pmax. However, apart from the dropping of NR transmission, an NR power scaling and a control method for NR transmission is a terminal (user equipment (UE)) implementation issue, and a detailed control method and hardware structure for this will be described.

Meanwhile, the technical feature of the present disclosure may be implemented by the first power amplifier 1210, the second power amplifier 1220, and the baseband processor 1400 as follows, but is not limited thereto, and some components may be omitted or changed depending on an application.

a. a first power amplifier for amplifying a first signal to a first power value in a first frequency band of a first communication system;

b. a second power amplifier for amplifying a second signal to a second power value in a second frequency band of a second communication system;

c. a baseband processor (modem, controller) for determining whether an average value exceeds a threshold value based on the average value of power values fed back from at least one of the first power amplifier and the second power amplifier for a predetermined time section when the first signal and the second signal are transmitted at the same time d. the baseband processor (modem, controller) may control a gain of a power amplifier of the second communication system to be decreased at predetermined time intervals when the average value exceeds the threshold value.

Figure 4A:
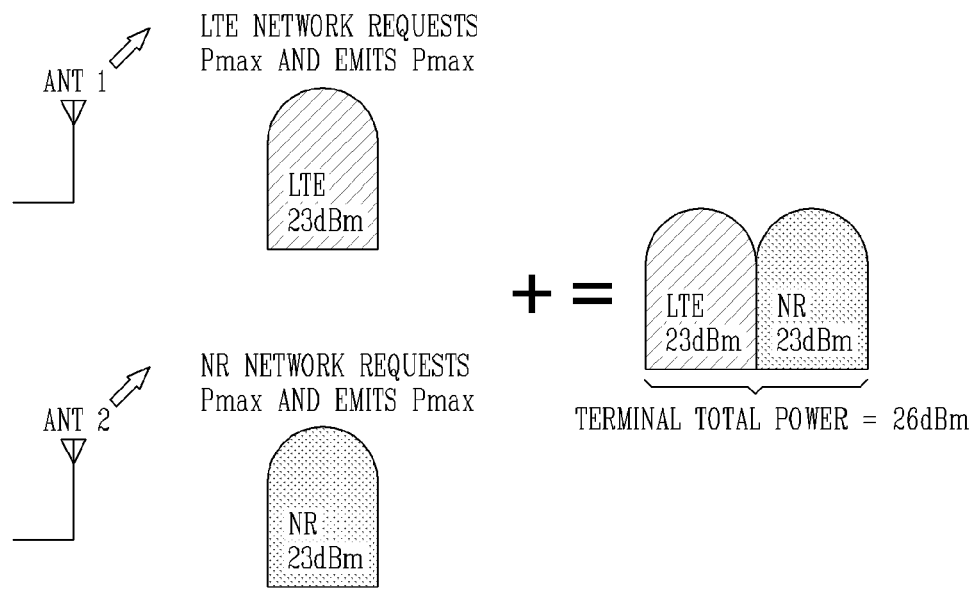
FIGS. 4A and 4B are conceptual views of total transmission power according to transmission power in a first communication system and a second communication system.
Figure 4B:
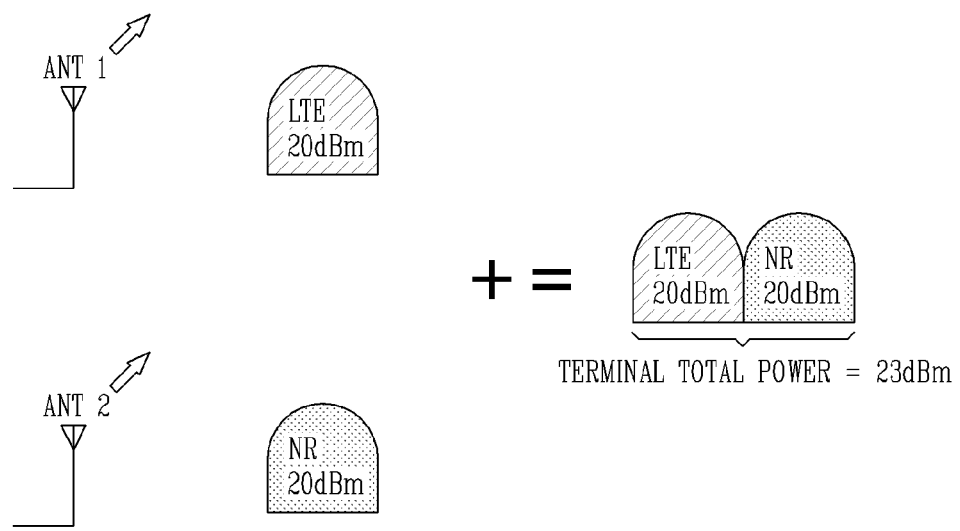

Meanwhile, FIGS. 4A and 4B are conceptual views of total transmission power according to transmission power in the first communication system and the second communication system. Referring to FIGS. 3 and 4A, the first signal may be amplified to the first power value in the first frequency band through the first power amplifier 1210. Here, the first signal amplified to the first power value is transmitted to the first base station through the first antenna ANT1.

On the other hand, the second signal may be amplified to the second power value in the second frequency band through the second power amplifier 1220. Here, the second signal amplified to the second power value is transmitted to the second base station through the second antenna ANT2. Here, in a non-stand-alone (NSA) structure, the first base station and the second base station may be disposed at a common location in a cell. On the other hand, in a stand-alone (SA) structure, the second base station may be disposed at a location different from the first base station.

Referring to FIGS. 3 and 4A, a multiple transmission structure according to the present disclosure is a 4G+5G EUTRAN NR dual connectivity (ENDO) structure. In addition, the multiple transmission structure according to the present disclosure may also be applied to the transmission structure of LTE FDD+5G TDD, but is not limited thereto. The transmission structure of LTE FDD+5G TDD is based on a 4G transmission, and a 5G transmission may be based on a scenario in which a transmission is performed only in a specific time section. Accordingly, when exceeding the total transmission power, a transmission/reception time section can be dynamically controlled in the 5G TDD scheme even if a 5G NR packet is dropped.

Meanwhile, each communication system may limit a maximum allowable power (Max Power) to a specific value. For example, each communication system may limit the maximum allowable power (Max Power) to 23 dBm, but is not limited thereto and may be changed according to an application.

Meanwhile, in a case of 4G TDD+5G TDD, it is not a violation of a standard, because a class of 26 dBm, in which 23 dBm of each of the maximum allowable power (Max Power) is summed, is defined. However, in cases of 4G FDD+5G TDD and 4G FDD+5G FDD, 26 dBm which is a sum of maximum allowable powers of two communication systems is not defined in a standard. In addition, it is difficult to define a standard that allows 26 dBm, which is the sum of the maximum allowable powers of the two systems, due to power characteristics of FDD.

Meanwhile, as illustrated in FIG. 4B, the transmission power may be 20 dBm when simultaneously transmitting through two communication systems. Meanwhile, the base station may limit the transmission power of each of the two communication systems to 20 dBm in consideration of power. However, this method requires a lot of effort from a standpoint of a network operator operating a base station, and such implementation is difficult. Therefore, a method for performing transmission power control in an electronic device operating in a plurality of communication systems as in the present disclosure is needed.

Therefore, the present disclosure intends to provide a specific control method from a standpoint of a terminal on how to adjust a summed power of two communication systems to a specific value, that is, 23 dBm as described above. In this regard, when a 4G modem (baseband processor) and a 5G modem are integrated or separated, the transmission power control method may be performed in a dual connectivity state between the terminal and the base station. Here, the transmission power control method may be performed in the dual connectivity state in which the terminal and the base station are connected, based on a signaling between the terminal and the base station and a signaling within the terminal.

Meanwhile, in the transmission power control method according to the present disclosure, the transmission power cannot be instantly and accurately matched to a specific value at a moment when a signal is transmitted. However, it is possible to limit the maximum allowable power Pmax in a next duty cycle after passing one Tx duty cycle. In this regard, a sum of the first power value and the second power value transmitted to the first communication system and the second communication system may be limited, or the first power value and the second power value may be respectively limited. For example, an algorithm may be performed to limit the sum of the first power value and the second power value to be less than or equal to 23 dBm, or to limit the first power value and the second power value to 20 dBm, respectively.

In this regard, as illustrated in FIG. 3, it is assumed that the electronic device is in a state of being connected to different communication systems and in a state in which multiple transmission is possible. Accordingly, when each of the first power value and the second power value is limited to 20 dBm, the sum of the first power value and the second power value can be 23 dBm or less.

Therefore, the present disclosure is to propose, a method for measuring a transmission power of one communication system to perform a pseudo power control for another communication system based on the measured transmission power. As described above, the present disclosure has an advantage in that, once a transmission power of one communication system is measured, power can be controlled without additionally measuring a transmission power of another communication system.

Figure 5:
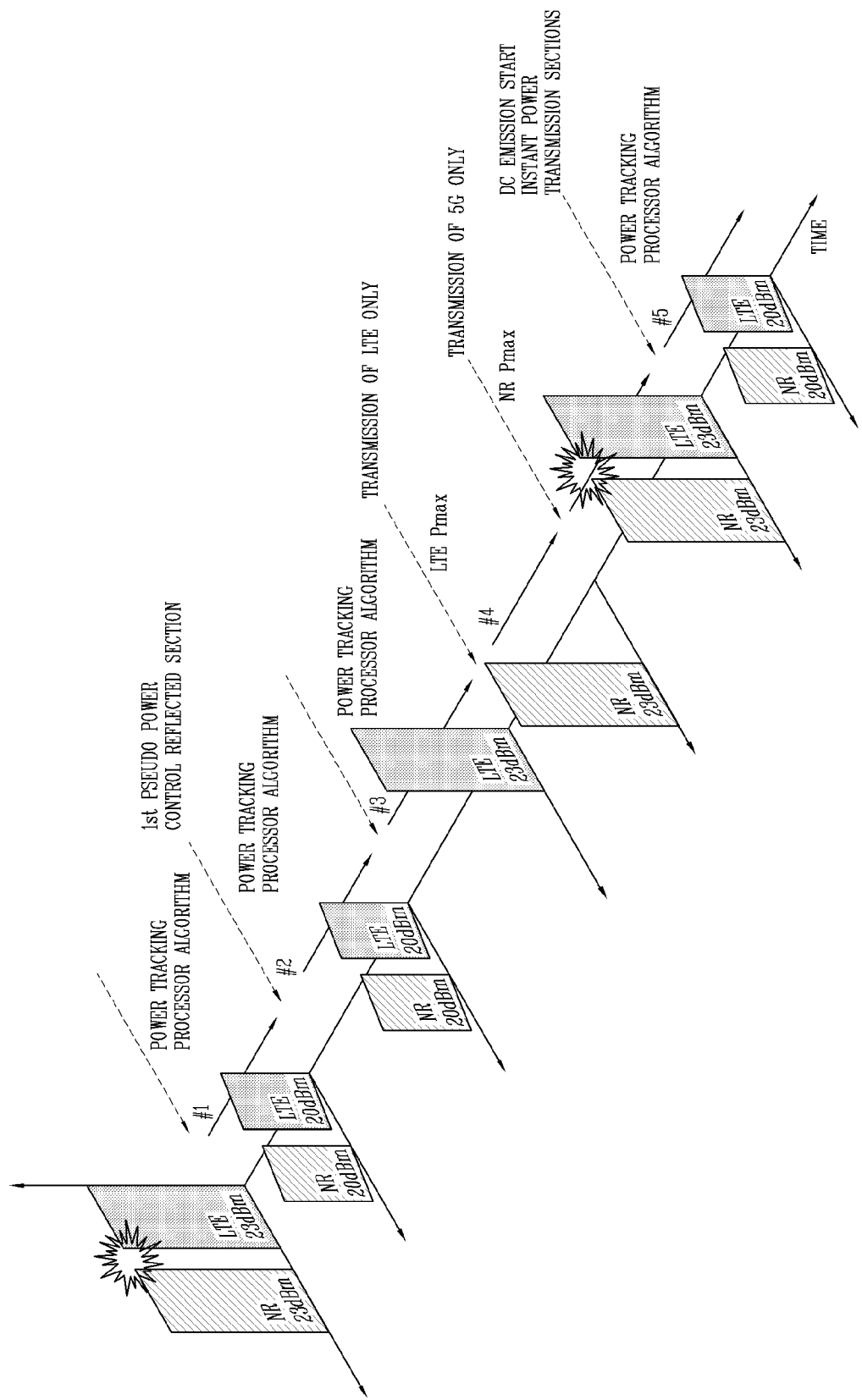
FIG. 5 is a conceptual diagram illustrating a method for controlling total transmission power based on time in a plurality of communication systems according to the present disclosure.

Meanwhile, FIG. 5 is a conceptual diagram illustrating a method for controlling total transmission power based on time in a plurality of communication systems according to the present disclosure. Referring to FIG. 5, a power control method based on a predetermined time section is illustrated, but the method is not limited thereto and may be applied to an event-based control method according to the total transmission power (or an average value of time thereof).

Time #1 is a point where a section in which the first signal and the second signal are outputted through a dual transmission in a dual connectivity (DC) 2-tx, that is a dual connectivity state is started. Here, if power measurement is performed to control an initial transmission power, an initial transmission time may be delayed. Therefore, in a first Tx period section, a signal is outputted preferentially without measuring and controlling the transmission power.

However, after that, when the DC situation is recognized, power tracking is performed on at least one of two transmissions (e.g., 4G transmission power). According to the power tracking, the maximum allowable power value may be limited to a specific value, for example, 20 dBm from time #2.

Meanwhile, the power tracking method is also performed at time #3. Thereafter, at time #3, a single transmission may be performed through a single transmission system. For example, when performing a single transmission only through the first communication system (4G/LTE communication system), a total transmission power may be limited to 23 dBm, which is an LTE max power. Accordingly, it falls back to a single transmission operation through the first communication system.

Meanwhile, as in time #5, when the DC operation is performed again, the terminal immediately checks the total transmission power or at least one of the first power value and the second power value. Accordingly, the terminal checks whether the total transmission power exceeds a threshold value (23 dBm) or whether at least one of the first power value and the second power value exceeds a specific value (20 dBm). Here, the terminal may limit the Pmax of the first communication system and the Pmax of the second communication system to a specific value, for example, 20 dBm, respectively.

Meanwhile, a detailed operation of an electronic device that performs power control in a plurality of communication systems according to the present disclosure will be described with reference to FIGS. 3, 4A, 4B, and 5.

As described above, the first power amplifier 1210 is configured to amplify the first signal to the first power value in the first frequency band of the first communication system. Meanwhile, the second power amplifier 1220 is configured to amplify the second signal to the second power value in the second frequency band of the second communication system. Here, the first frequency band and the second frequency band may be adjacent frequency bands as illustrated in FIGS. 4A and 4B, but are not limited thereto.

In this regard, in a case of LTE re-farming in which the 5G NR partially reuses the 4G band, the first frequency band and the second frequency band may at least partially overlap. In addition, when the 5G NR uses a frequency band different from the 4G band, for example, the Sub 6 band, the first frequency band and the second frequency band may be spaced apart from each other without overlapping.

Meanwhile, when transmitting the first signal and the second signal simultaneously, the baseband processor 1400 may determine whether an average value of values fed back from the first power amplifier 1210 for a predetermined time section exceeds a threshold value. To this end, at least one of the first power value and the second power value may be measured based on an average of values fed back from at least one of the first power amplifier 1210 and the second power amplifier 1220 for a predetermined time section. Here, a pseudo dynamic power control for measuring only 4G transmission power, and controlling 5G transmission power according to a total transmission power limitation condition may be performed. Therefore, by measuring a power of one communication system based on an average value for a predetermined time section, transmission power for remaining communication systems can be quickly and accurately performed without measuring power for all communication systems.

Meanwhile, the baseband processor 1400 determines whether the sum of the first power value and the second power value requested from the first communication system and the second communication system exceeds a maximum allowable power value to control the transmission power without measuring the transmission power. However, in this case, by measuring an actual transmission power of at least one communication system, transmission power of another communication system can be dynamically controlled.

Accordingly, the base station may allow the terminal to autonomously determine an optimum transmission power within a transmittable power control range. Accordingly, by measuring an actual transmission power in one communication system, the terminal can control the transmission power of another communication system up to a maximum allowable power range.

For example, when the 4G base station transmits the first signal to the terminal within a range of 20 to 23 dBm, the first power value actually measured by the terminal may be 20 dBm. Here, the terminal can perform 5G transmission at a second power value of 20 dBm without dropping the 5G NR.

Meanwhile, when the 4G base station allows the terminal to transmit the first signal at or less than 20 dBm, the terminal can perform 5G transmission at a second power value of 20 dBm without measuring a power.

Meanwhile, when the sum of the first power value and the second power value requested from the first communication system and the second communication system exceeds the maximum allowable power value, i.e., when the sum of the first power value and the second power value exceeds the maximum allowable power value of 23 dBm, gains can be controlled as follows. Here, the baseband processor 1400 can control the transceiver circuit 1250 to reduce a gain of the second power amplifier 1220 of the 5G communication system, i.e., to allow the sum of the first power value and the second power value to be less than or equal to the maximum allowable power value.

Therefore, the 4G transmission power can be maintained at a predetermined level unlike the 5G transmission power. In this regard, when 5G channel environment is good, 5G stand-alone operation such as 5G MIMO may be performed. Accordingly, in a dual connectivity (DC) state, a priority of 4G transmission is set higher than that of 5G transmission, so that at least one communication link can always be maintained.

Meanwhile, when an average value of values fed back from the first power amplifier 120 for a predetermined time section exceeds a threshold value, and a difference between the first power value and the second power value is less than or equal to a specific value, the following scaling control can be performed. On the other hand, when a sum of an average value of values fed back from the first power amplifier 120 for a predetermined time section and the second power value exceeds a second threshold value, and a difference between the first power value and the second power value is less than or equal to a specific value, the following scaling control can be performed.

Here, the baseband processor 1400 may control the transceiver circuit 1250 so that the first power value and the second power value are scaled to be reduced in a same ratio. FIG. 5 illustrates a case in which the sum of the first power value and the second power value, such as 23 dBm, exceeds a threshold value, and the difference between the first power value and the second power value is less than or equal to a specific value at time #5. Here, both the first power value and the second power value may be reduced in a same ratio, which is 3 dB, so that both the first power value and the second power value become 20 dBm. Alternatively, the baseband processor 1400 may control the transceiver circuit 1250 so that the first power value and the second power value are scaled to be reduced at a ratio proportional to magnitudes of the first power value and the second power value.

In this regard, all communication links can be maintained by maintaining the same or a specific ratio of transmission power levels as possible for the two communication systems in a dual connectivity (DC) state.

Meanwhile, the baseband processor 1400 may control the transceiver circuit so that the first power value is scaled to increase to the maximum allowable power value in a time section in which there is no packet transmission through the second communication system. Referring to FIG. 5, when 5G transmission is not performed in time #4, the first power value may be increased from 20 dBm to 23 dBm, which is the maximum allowable power value. Accordingly, 4G transmission power can be optimized in a section without 5G transmission even in a dual connectivity state.

Figure 6:
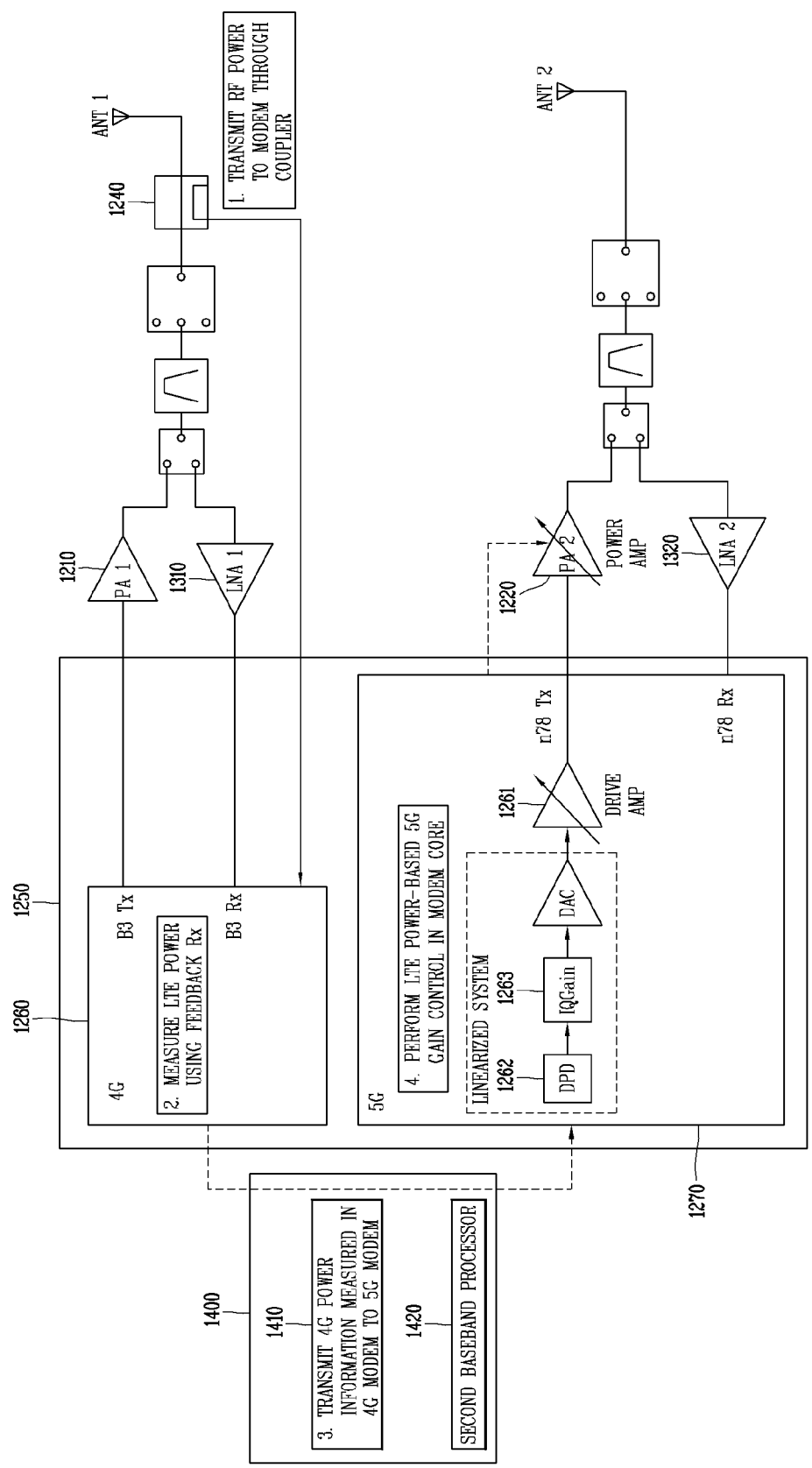
FIG. 6 illustrates a detailed configuration of an electronic device that performs a transmission power control using a transceiver circuit and a baseband processor according to another embodiment of the present disclosure.

Meanwhile, when controlled by the baseband processor 1400, the transceiver circuit 1250 may dynamically control gains of various amplifiers in the transmission system. In this regard, FIG. 6 illustrates a detailed configuration of an electronic device that performs a transmission power control using a transceiver circuit and a baseband processor according to another embodiment of the present disclosure. Referring to FIG. 6, the transceiver circuit 1250 may include the first transceiver circuit 1260 and the second transceiver circuit 1270 respectively operating in the first communication system and the second communication system. In addition, the baseband processor 1400 corresponding to the modem or the controller may also include a first baseband processor 1410 and a second baseband processor 1420 respectively operating in the first communication system and the second communication system.

Referring to FIG. 6, in an actual power control algorithm, an inactive #1 pseudo power controller, for example, the baseband processor 1400 or the first baseband processor 1410 exists.

This power control method may be activated in a dual connectivity (ENDO) situation and deactivated in a stand alone situation. Meanwhile, the activated ENDO plays a role to sum up monitored power detect values to deliver how much margin is available to increase the power to each system. As illustrated in FIG. 6, a power value may be detected in a first communication system, i.e., a 4G communication system, and based on this, pseudo dynamic power control may be performed in a second communication system, i.e., a 5G communication system.

Here, when the summed power exceeds a value defined in the specification, the transmission power may be immediately limited. For example, when the summed power exceeds a value defined in the specification, each transmission power is limited to 20 dBm, thereby limiting the transmission power of two communication systems. However, the present disclosure is not limited thereto, and transmission power of the 5G communication system may be limited when the average power value measured in the 4G communication system exceeds the threshold value.

Meanwhile, unlike FIG. 6, the second communication system, i.e., the 5G communication system, may detect the power value, and based on this, the first communication system, i.e., the 4G communication system, may perform pseudo dynamic power control. Alternatively, transmission power may be measured in both the first communication system and the second communication system, i.e., the 4G communication system and the 5G communication system, and based on this, pseudo dynamic power control may be performed in any one of the first communication system and the second communication system.

Meanwhile, a core of such an algorithm is a controller of an interface activated only in ENDO, and a specific method for this may be performed according to Table 1, Table 2, and various embodiments of the present disclosure.

Meanwhile, the above-described first transceiver circuit 1260, the second transceiver circuit 1270, the first baseband processor 1410, and the second baseband processor 1420 may be implemented in physically separated chips, or may be physically implemented in one chip with being functionally separated.

Meanwhile, when a gain of the second power amplifier 1220 of the 5G communication system is greater than or equal to a first gain value, the transceiver circuit 1250 may reduce a gain of the driving amplifier 1261 at a rear stage of the second power amplifier 1220. That is, the gain of the second power amplifier 1220 may be greater than or equal to the first gain value, so that the sum of the first power value and the second power value may be greater than or equal to 23 dBm. In this case, without reducing the gain of the second power amplifier 1220, the gain of the driving amplifier 1261 may be adjusted by a precise level (e.g., in units of 0.1 dB or 0.01 dB). In this regard, since the second power amplifier 1220 operates at a high output, it may not be easy to control a gain by a precise level based on voltage control.

Meanwhile, when the gain of the driving amplifier is equal to or greater than the second gain value, the transceiver circuit 1250 may reduce an input power inputted to the driving amplifier 1261. In this regard, the second power value, which is 5G transmission power, may be reduced by lowering input power level inputted from the transceiver circuit 1250 to the driving amplifier 1261. Therefore, when a power consumption itself increases due to the driving amplifier 1261 and the high input power, the second power value, which is 5G transmission power, can be reduced while lowering the input power level to lower a direct current (DC) power consumption.

Meanwhile, a detailed description of a transmission power control process for two communication systems in a dual connectivity (DC) state illustrated in FIG. 4 is as follows. The baseband processor 1400 may limit a total power value so that the total power value is equal to or less than the maximum allowable power value by reducing the first power value and the second power value in a same ratio. That is, at time #1, when both the first power value and the second power value are 23 dBm, the sum of the first power value and the second power value may be limited to 23 dBm or less at time #2 by setting the value to 20 dBm reduced by 3 dB.

Meanwhile, when the first signal is transmitted only to the first base station (4G base station) of the first communication system, the baseband processor 1400 may increase the first power value to a maximum allowable power value, that is, 23 dBm. That is, when only 4G transmission is performed at time #3, the first power value for 4G transmission may be increased to 23 dBm, which is the maximum allowable power value.

On the other hand, when the first signal is transmitted to the first base station (4G base station) while transmitting the second signal, the transceiver circuit 1250 may be controlled so that the first power value and the second power value are scaled to be reduced in a ratio of a corresponding power value. That is, a case where the second signal is transmitted at time #4, and then both the first signal and the second signal are transmitted at time #5 and time #6. Here, at time #5, the sum of the first power value and the second power value exceeds the maximum allowable power value of 23 dBm. Therefore, at time #6, the first power value and the second power value may be set to 20 dBm, which is reduced by 3 dB, so that the sum of the first power value and the second power value is 23 dBm or less.

Meanwhile, the first transceiver circuit 1260 may measure the first power value during a predetermined time section through a feedback reception path. Here, the baseband processor 1400 may receive information on the measured first power value from the first transceiver circuit 1260, and transfer information on the second power value to the second transceiver circuit 1270.

Accordingly, the baseband processor 1400 may determine the second power value such that the sum of the first power value and the second power value according the fed back average value is less than or equal to the threshold value. In this regard, Table 1 is a method for determining 5G transmission power based on a lookup table according to the present disclosure. In Table 1, a predetermined time section for measuring a fed back average power value is 200 ms, but is not limited thereto and can be changed according to an application. For example, the predetermined time section may be determined as a multiple of a subframe period or a minimum control unit, e.g., a multiple of a mini slot period in 5G.

TABLE 1

| LTE TX avg. power (dBm) for 200 ms period | LTE Power Index (dBm) | Max. allowed NR Power per each LTE power index to consider EN-DC PC3 23 dBm(For SAR optimization, the power can be reduced by OEM) | LTE + NR combined TX power |
| --- | --- | --- | --- |
| 22 < LTE TXP < 23 | 23 | 0 | 23 |
| 21 < LTE TXP < 22 | 22 | 16 | 23 |
| 20 < LTE TXP < 21 | 21 | 18.7 | 23 |
| 19 < LTE TXP < 20 | 20 | 20 | 23 |
| 18 < LTE TXP < 19 | 19 | 20.8 | 23 |
| 17 < LTE TXP < 18 | 18 | 21.4 | 23 |

TABLE 1-continued

| LTE TX avg. power (dBm) for 200 ms period | LTE Power Index (dBm) | Max. allowed NR Power per each LTE power index to consider EN-DC PC3 23 dBm(For SAR optimization, the power can be reduced by OEM) | LTE + NR combined TX power |
| --- | --- | --- | --- |
| 16 < LTE TXP < 17 | 17 | 21.8 | 23 |
| 15 < LTE TXP < 16 | 16 | 22 | 23 |
| 14 < LTE TXP < 15 | 15 | 22.3 | 23 |
| 13 < LTE TXP < 14 | 14 | 22.4 | 23 |
| 12 < LTE TXP < 13 | 13 | 22.5 | 23 |
| 11 < LTE TXP < 12 | 12 | 22.6 | 23 |
| 10 < LTE TXP < 11 | 11 | 22.7 | 23 |
| 9 < LTE TXP < 10 | 10 | 22.8 | 23 |

Meanwhile, as shown in Table 1, 5G NR transmission power may be controlled by using an estimated transmission power measured through the first communication system in units of 1 dB. However, it is not limited to this method, and 5G NR transmission power may be controlled by using the transmission power measured and predicted through the first communication system as shown in Table 2 as a specific section unit. That is, the 5G NR transmission power can be controlled in units of meaningful specific section without precisely performing transmission power control as shown in Table 1.

TABLE 2

| | Maximum Tx Power (dBm) per RAT | |
| --- | --- | --- |
| LTE's Reported Tx Power (dBm) | Max (TX1)(LTE) | TX2 (NR) |
| TX1 < x1 = 16.9 | 23 | 21.7 |
| 16.9 <= TX1 < x2 = 20 | 23 | 20 |
| 20 <= TX1 < x3 = 21.7 | 23 | 16.9 |
| 21.7 <= TX1 < x4 = 23 | 23 | 0 (drop) |

Referring to Table 2, even if the first power value, which is the 4G transmission power value, does not reach an upper bound value for each section, the second power value, which is the 5G transmission power value, may be determined based on the upper bound value for each section when the first power value exceeds a lower bound value for each section. Accordingly, even if the upper bound value of the first power value does not reach 20 dBm, the second power value may be determined to be 20 dBm in consideration of the upper bound value when the first power value is equal to or greater than the lower bound value of 16.9 dBm. In addition, even if the upper bound value of the first power value does not reach 23 dBm, it is preferable to drop 5G NR packet transmission in consideration of the upper bound value when the first power value is equal to or greater than the lower bound value of 21.7 dBm.

With this transmission power control method, transmission power control can be performed in advance before a sum of transmission powers exceeds a maximum transmission power value.

Meanwhile, the transmission power control methods based on the lookup tables in Table 1 and Table 2 have a common point in that each threshold value is set for each specific power section. In other words, the lower bound and upper bound of the threshold value for each section of the first power value, which is a transmission power of the 4G communication system, are considered. Accordingly, when the fed back average power value is greater than or equal to a lower bound of the threshold value for each power section for the first power value, an output power value of the second power amplifier 1220 may be determined based on the upper bound of the threshold value. For example, referring to Table 1, when the first power value, which is 4G transmission power, is 22 dBm or greater, the output power value of the second power amplifier 1220 may be determined to be 0 dBm based on 23 dBm, which is the upper bound of the threshold value in a section of 22 dBm to 23 dBm. Accordingly, a summed power of LTE+NR does not exceed 23 dBm at the most. In addition, when the first power value, which is 4G transmission power, is 21 dBm or greater, the output power value of the second power amplifier 1220 may be determined to be 16 dBm based on 22 dBm, which is the upper bound of the threshold value in a section of 21 dBm to 22 dBm. Accordingly, a summed power of LTE+NR does not exceed 23 dBm at the most.

Similarly, referring to Table 2, when the first power value, which is 4G transmission power, is 21.7 dBm or greater, the output power value of the second power amplifier 1220 may be determined to be 0 dBm based on 23 dBm, which is the upper bound of the threshold value in a section of 21.7 dBm to 23 dBm. Accordingly, a summed power of LTE+NR does not exceed 23 dBm at the most. In addition, when the first power value, which is 4G transmission power, is 20 dBm or greater, the output power value of the second power amplifier 1220 may be determined to be 16.9 dBm based on 21.7 dBm, which is the upper bound of the threshold value in a section of 20 dBm to 21.7 dBm. Accordingly, a summed power of LTE+NR does not exceed 23 dBm at the most.

Therefore, with the transmission power control method according to the present disclosure, the total transmission power can be controlled by measuring only the first transmission power, which is 4G transmission power, to compare only the measured first transmission power with the threshold value.

Meanwhile, as illustrated in FIG. 6, the second baseband processor 1420 configured to perform power control for the second communication system may be provided in the baseband processor 1400. Here, the second baseband processor 1420 may adjust the gain of the second power amplifier 1220 based on the determined second power value. Here, when the second power value needs to be greatly increased or decreased, it is preferable to directly adjust the gain of the second power amplifier 1220. Meanwhile, the second baseband processor 1420 may determine the second power value such that the sum of the first power value and the second power value according the fed back average value is less than or equal to the second threshold value. Alternatively, the second baseband processor 1420 may allow the first power value according to the fed back average value to be less than or equal to the threshold value to determine the second power value such that the sum of the first power value and the second power value according the fed back average value is less than or equal to the second threshold value. Or, the second baseband processor 1420 may allow an upper bound of the first power value according to the fed back average value to be less than or equal to the second threshold value so that the sum of the first power value and the second power value according the fed back average value is less than or equal to the second threshold value.

Here, the second threshold value may be set higher than the threshold value by a predetermined level. For example, when the second threshold value is 26 dBm, the threshold value may be set to 23 dBm. Alternatively, when the second threshold value is 23 dBm, the threshold value may be set to 20 dBm, but is not limited thereto and may be changed according to an application.

Meanwhile, when an input power corresponding to the determined second power value is greater than or equal to a specific value, the second baseband processor 1420 may dynamically control gains of the driving amplifier and the baseband amplifier as follows. Here, the second baseband processor 1420 may control the gain of the driving amplifier 1261 included in the second transceiver circuit 1270 to be increased. In addition, the second baseband processor 1420 may control the gain of an IQ amplifier 1263 at a rear stage of the digital pre-distortion (DPD) portion 1262 included in the second transceiver circuit 1270 to be increased.

Hereinafter, referring to FIGS. 5 and 6, a method for measuring a transmission power of any one communication system through a coupler according to another embodiment of the present disclosure to perform a pseudo dynamic power transmission for another communication system based on the measurement of the transmission power will be described.

As described above, the first power amplifier 1210 is configured to amplify the first signal to the first power value in the first frequency band of the first communication system. The second power amplifier 1220 is configured to amplify the second signal to the second power value in the second frequency band of the second communication system. Further, a coupler 1240 is connected to the first power amplifier and configured to detect the first power value. Here, the first communication system and the second communication system may be the 4G communication system and the 5G communication system, respectively, but are not limited thereto. Meanwhile, although both the first power amplifier 1210 and the second power amplifier 1220 can operate in the 4G communication system and the 5G communication system, it is assumed that each of them operates in the 4G communication system and the 5G communication system, respectively.

On the other hand, the first power amplifier 1210 and the second power amplifier 1220 may operate in the 5G communication system and the 4G communication system, respectively. Here, the first transceiver circuit 1260 and the second transceiver circuit 1270 may control the second power amplifier 1220 and the first power amplifier, respectively. However, when the first transceiver circuit 1260 and the second transceiver circuit 1270 are configured to operate in both the first communication system and the second communication system, the first transceiver circuit 1260 and the second transceiver circuit 1270 may control the first power amplifier 1210 and the second power amplifier 1220, respectively.

Meanwhile, when transmitting the first signal and the second signal at the same time, the baseband processor 1400 determines whether the sum of the first power value and the second power value exceeds the second threshold value, based on the average value of values fed back from the first power amplifier 1210 for a predetermined time section. Here, the baseband processor 1400 may also determine whether the average value of values fed back from the first power amplifier 1210 for the predetermined time section exceeds the threshold value.

Accordingly, when the sum of the first power value and the second power value, which is the fed back average value, exceeds the second threshold value, the baseband processor 1400 may reduce a gain of at least one of the first power amplifier 1210 and the second power amplifier 1220. In relation to the transmission power control, a value of at least one of the first power value and the second power value outputted through the first power amplifier 1210 and the second power amplifier 1220 may be reduced instead of the gain value.

Meanwhile, the first transceiver circuit 1260 may measure the first power value during a predetermined time section through the feedback reception (RX) path. In addition, the baseband processor 1400 may receive information on the measured first power value from the first transceiver circuit 1260, and transfer information on the second power value to the second transceiver circuit 1270. Here, the baseband processor 1400 can perform pseudo dynamic power control by determining the second power value such that the sum of the first power value (or an upper bound value obtained by adding a margin to the first threshold value) and the second power value is less than or equal to the second threshold value.

Here, the second baseband processor 1420 may perform power control on the second communication system. Accordingly, the second baseband processor 1420 may adjust the gain of the second power amplifier 1220 based on the determined second power value. Therefore, when the transmission power control is performed in a large range, it is preferable to directly adjust the gain of the second power amplifier 1220.

Meanwhile, when the input power corresponding to the determined second power value is greater than or equal to a specific value, the second baseband processor 1420 may finely adjust gains of the driving amplifier 1261 and the baseband amplifier 1263 as follows. Accordingly, the second baseband processor 1420 may increase the gain of the driving amplifier 1261 included in the second transceiver circuit 1270, and the gain of the IQ amplifier 1263 at the rear stage of the digital pre-distortion (DPD) portion included in the second transceiver circuit 1270.

Here, the gain of the driving amplifier 1261 can be finely tuned by units of 0.01 dB unlike a case in which the gain of the second power amplifier 1220 is directly adjusted. Meanwhile, controlling the gain of the IQ amplifier 1263 corresponds to controlling the gain of the baseband amplifier. In particular, since the gain of the amplifier along with digital pre-distortion (DPD) can be controlled in a digital area, a linearity of the second power amplifier 1220 in an analog area can be improved. For example, when a saturation point of the second power amplifier 1220 is near the NR maximum power of 23 dBm, the linearity near the NR maximum power value can be improved by controlling digital pre-distortion (DPD) and gains. In other words, by controlling the gain of the IQ amplifier 1263, digital pre-distortion (DPD) compensation (control) can be performed at an optimum power level in which the digital pre-distortion (DPD) compensation can be most optimally performed.

The foregoing description has been given of an electronic device that performs power control on transmission signals in a plurality of communication systems according to the present disclosure. Technical effects of the electronic device performing power control will be described as follows.

The electronic device for transmitting the reference signal according to the present disclosure has an advantage of being able to limit the total transmission power based on the average of the fed back power values during multiple transmission through the 4G communication system and the 5G communication system.

According to the present disclosure, an electronic device capable of, based on an average of power values fed back from one power amplifier during multiple transmission through a plurality of communication systems, controlling a transmission power value of another communication system can be provided.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned present disclosure, design and operations of a transmitting unit including a power amplifier and a transceiver and a receiving unit and an RFIC including a low-noise amplifier can be implemented as computer-readable codes in a program-recorded medium. The computer-readable media may include all types of recording devices each storing data readable by a computer system. Examples of such computer-readable medium may include hard disk drive (HDD), solid state disk (SSD), silicon disk drive (SDD), ROM, RAM, CD-ROM, magnetic tape, floppy disk, optical data storage element and the like. Also, the computer-readable media may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. An electronic device, comprising:
a first power amplifier for amplifying a first signal to a first power value in a first frequency band of a first communication system;
a second power amplifier for amplifying a second signal to a second power value in a second frequency band of a second communication system; and
a baseband processor for determining whether an average value of power values fed back from the first power amplifier for a predetermined time section exceeds a threshold value when the first signal and the second signal are transmitted at the same time, and decreasing a gain of at least one of the first power amplifier or the second power amplifier at predetermined time intervals when the average value exceeds the threshold value,
wherein the baseband processor controls a transceiver circuit to reduce the gain of the second power amplifier of a 5G communication system so as a sum of the first power value and the second power value to be equal to or less than a maximum allowable power value when the sum of the first power value and the second power value requested from the first communication system and the second communication system exceeds the maximum allowable power value.

2. The electronic device of claim 1, wherein the baseband processor determines an output power value of the second power amplifier based on an upper bound of the threshold value when the average value is greater than or equal to a lower bound of the threshold value for each power section for the first power value.

3. The electronic device of claim 1, wherein the baseband processor controls the transceiver circuit so that the first power value and the second power value are scaled to be reduced in a same ratio when the sum of the first power value and the second power value exceeds the maximum allowable power value and a difference between the first power value and the second power value is less than or equal to a specific value, and controls the transceiver circuit so that the first power value is scaled to be increased to the maximum allowable power value in a time section where a packet transmission through the second communication system is not performed.

4. The electronic device of claim 3, wherein the transceiver circuit reduces a gain of a driving amplifier at a rear stage of the second power amplifier when the gain of the second power amplifier of the 5G communication system is greater than or equal to a first gain value.

5. The electronic device of claim 4, wherein the transceiver circuit reduces an input power inputted to the driving amplifier when the gain of the driving amplifier is greater than or equal to a second gain value.

6. The electronic device of claim 1, wherein the baseband processor reduces the first power value and the second power value in a same ratio to limit a total power value to be less than or equal to a maximum allowable power value, and controls the first power value to be increased to the maximum allowable power value when transmitting a first signal only to a first base station of the first communication system.

7. The electronic device of claim 6, wherein the baseband processor controls the second power value to be increased to the maximum allowable power value when transmitting a second signal only to a second base station of the second communication system.

8. The electronic device of claim 7, wherein the baseband processor controls the transceiver circuit so that the first power value and the second power value are scaled to be reduced in a ratio of a corresponding power value when transmitting the first signal to the first base station while transmitting the second signal.

9. The electronic device of claim 1, wherein the transceiver circuit comprises:
a first transceiver circuit operating in the first communication system; and
a second transceiver circuit operating in the second communication system,
wherein the first transceiver circuit measures the first power value for a predetermined time section through a feedback reception path, and
wherein the baseband processor receives information on the measured first power value from the first transceiver circuit, and transfers information on the second power value to the second transceiver circuit.

10. The electronic device of claim 9, wherein the baseband processor allows the first power value according to the fed back average value to be less than or equal to the threshold value to determine the second power value such that a sum of the first power value and the second power value according to the fed back average value is less than or equal to a second threshold value.

11. The electronic device of claim 10, wherein the baseband processor comprises a second baseband processor that performs power control for the second communication system, and
wherein the second baseband processor adjusts the gain of the second power amplifier based on the determined second power value.

12. The electronic device of claim 11, wherein the second baseband processor controls a gain of a driving amplifier included in the second transceiver circuit and a gain of an IQ amplifier at a rear stage of a digital pre-distortion (DPD) portion included in the second transceiver circuit to be increased when an input power corresponding to the determined second power value is greater than or equal to a specific value.

13. An electronic device, comprising:
a first power amplifier for amplifying a first signal to a first power value in a first frequency band of a first communication system;
a second power amplifier for amplifying a second signal to a second power value in a second frequency band of a second communication system;
a coupler connected to the first power amplifier and configured to detect the first power value; and
a baseband processor for determining whether a sum of the first power value and the second power value exceeds a second threshold value based on an average value of power values fed back from the first power amplifier for a predetermined time section when the first signal and the second signal are transmitted at the same time, and decreasing a gain of at least one of the first power amplifier or the second power amplifier at predetermined time intervals when the sum of the first power value and the second power value exceeds the second threshold value.

14. The electronic device of claim 13, comprising:
a first transceiver circuit operating in the first communication system; and
a second transceiver circuit operating in the second communication system,
wherein the first transceiver circuit measures the first power value for a predetermined time section through a feedback reception path, and
wherein the baseband processor receives information on the measured first power value from the first transceiver circuit, and transfers information on the second power value to the second transceiver circuit.

15. The electronic device of claim 13, wherein the baseband processor allows the first power value according to the fed back average value to be less than or equal to the threshold value to determine the second power value such that a sum of the first power value and the second power value according to the fed back average value is less than or equal to the threshold value.

16. The electronic device of claim 15, wherein the baseband processor comprises a second baseband processor that performs power control for the second communication system, and
wherein the second baseband processor adjusts the gain of the second power amplifier based on the determined second power value.

17. The electronic device of claim 16, wherein the second baseband processor controls a gain of a driving amplifier included in the second transceiver circuit and a gain of an IQ amplifier at a rear stage of a digital pre-distortion (DPD) portion included in the second transceiver circuit to be increased when an input power corresponding to the determined second power value is greater than or equal to a specific value.

* * * * *